US009760765B2

(12) United States Patent
Shibutani (10) Patent No.: US 9,760,765 B2
(45) Date of Patent: Sep. 12, 2017

(54) DIGITAL SIGNAGE APPARATUS WHICH PERFORMS FACE RECOGNITION AND DETERMINES WHETHER A BEHAVIOR OF A PERSON SATISFIES A PREDETERMINED CONDITION, AND COMPUTER READABLE MEDIUM

(71) Applicant: CASIO COMPUTER CO., LTD., Shibuya-ku, Tokyo (JP)

(72) Inventor: Atsushi Shibutani, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/009,703

(22) Filed: Jan. 28, 2016

(65) Prior Publication Data
US 2016/0275337 A1    Sep. 22, 2016

(30) Foreign Application Priority Data
Mar. 19, 2015 (JP) .................................. 2015-055518

(51) Int. Cl.
| | | |
|---|---|---|
| *G06K 9/62* | (2006.01) | |
| *G06K 9/00* | (2006.01) | |
| *G06Q 30/02* | (2012.01) | |
| *G06K 9/03* | (2006.01) | |

(52) U.S. Cl.
CPC ........... *G06K 9/00288* (2013.01); *G06K 9/03* (2013.01); *G06Q 30/02* (2013.01); *G06K 2009/00322* (2013.01)

(58) Field of Classification Search
CPC ............................. G06K 9/00221–2009/00328
See application file for complete search history.

(56) References Cited

U.S. PATENT DOCUMENTS

2008/0002865 A1* 1/2008 Toyoda .............. H04N 5/23212
382/118

FOREIGN PATENT DOCUMENTS

| JP | 2006202049 A | 8/2006 |
|---|---|---|
| JP | 2012053813 A | 3/2012 |

* cited by examiner

*Primary Examiner* — Brian P Werner
(74) *Attorney, Agent, or Firm* — Holtz, Holtz & Volek PC (57) ABSTRACT

In a digital signage apparatus, a controller makes an imaging unit photograph in a first image quality mode and performs face recognition to a captured image obtained by the imaging unit. When the predetermined condition is satisfied in which the behavior of the person in front of the digital signage apparatus is assumed to be interested in the digital signage apparatus, the controller makes the imaging unit photograph in the second image quality mode higher than the first image quality and performs the face recognition to the captured image obtained by the imaging unit. The above case includes cases where the user operation has been detected, where the size of the face recognized from the captured image is equal to or larger than the predetermined size, and where the moving amount of the face recognized from the captured image is equal to or less than the predetermined amount.

20 Claims, 5 Drawing Sheets

|  | MEN | WOMEN |
|---|---|---|
| CHILD (19 YEARS OLD OR YOUNGER) | A1 | A2 |
| ADULT (20 TO 59 YEARS OLD) | A3 | A4 |
| ELDERLY (60 YEARS OLD OR OLDER) | A5 | A6 |

| | MEN | WOMEN |
|---|---|---|
| 10 YEARS OLD OR YOUNGER | B1 | B2 |
| 10 TO 19 YEARS OLD | B3 | B4 |
| 20 TO 29 YEARS OLD | B5 | B6 |
| 30 TO 39 YEARS OLD | B7 | B8 |
| 40 TO 49 YEARS OLD | B9 | B10 |
| 50 TO 59 YEARS OLD | B11 | B12 |
| 60 TO 69 YEARS OLD | B13 | B14 |
| 70 YEARS OLD OR OLDER | B15 | B16 |

FIG. 5

DIGITAL SIGNAGE APPARATUS WHICH PERFORMS FACE RECOGNITION AND DETERMINES WHETHER A BEHAVIOR OF A PERSON SATISFIES A PREDETERMINED CONDITION, AND COMPUTER READABLE MEDIUM

BACKGROUND

1. Technical Field

The present invention relates to an information processor and a computer readable medium.

2. Related Art

Conventionally, a technique for performing face recognition by using a captured image of a person has been known.

For example, JP 2006-202049 A discloses that an attribute of an imaged person is estimated and a recognition unit recognizes the person by using an individual identification feature amount stored in corresponding to the estimated result in order to realize face recognition at high speed regardless of the imaged place and time.

Also, generally, the face recognition is performed by using a minimum image size in order to perform the processing at high speed.

SUMMARY

However, when the image size is small, the image quality is not enough. Therefore, when an attribute of the person is recognized by using the captured image, there has been a case where the recognition cannot be accurately performed.

A purpose of the present invention is to perform face recognition with a necessary image quality.

According to an embodiment of the present invention, there is provided an information processor including: an imaging unit configured to image a person; and a controller configured to perform face recognition to a captured image with a first image quality obtained based on an image imaged by the imaging unit, determine whether a behavior of the person has satisfied a predetermined condition, and perform the face recognition to a captured image with a second image quality which is higher than the first image quality obtained based on the image imaged by the imaging unit when it has been determined that the behavior of the person has satisfied the predetermined condition.

According to the present invention, face recognition can be performed with a necessary image quality.

DETAILED DESCRIPTION

A preferred embodiment according to the present invention will be described in detail below with reference to the attached drawings. In the following embodiment, a case where an information processor according to the present invention is applied to a digital signage apparatus 1 will be described as an example. The present invention is not limited to the example.

[Structure of Digital Signage Apparatus 1]

Figure 1:
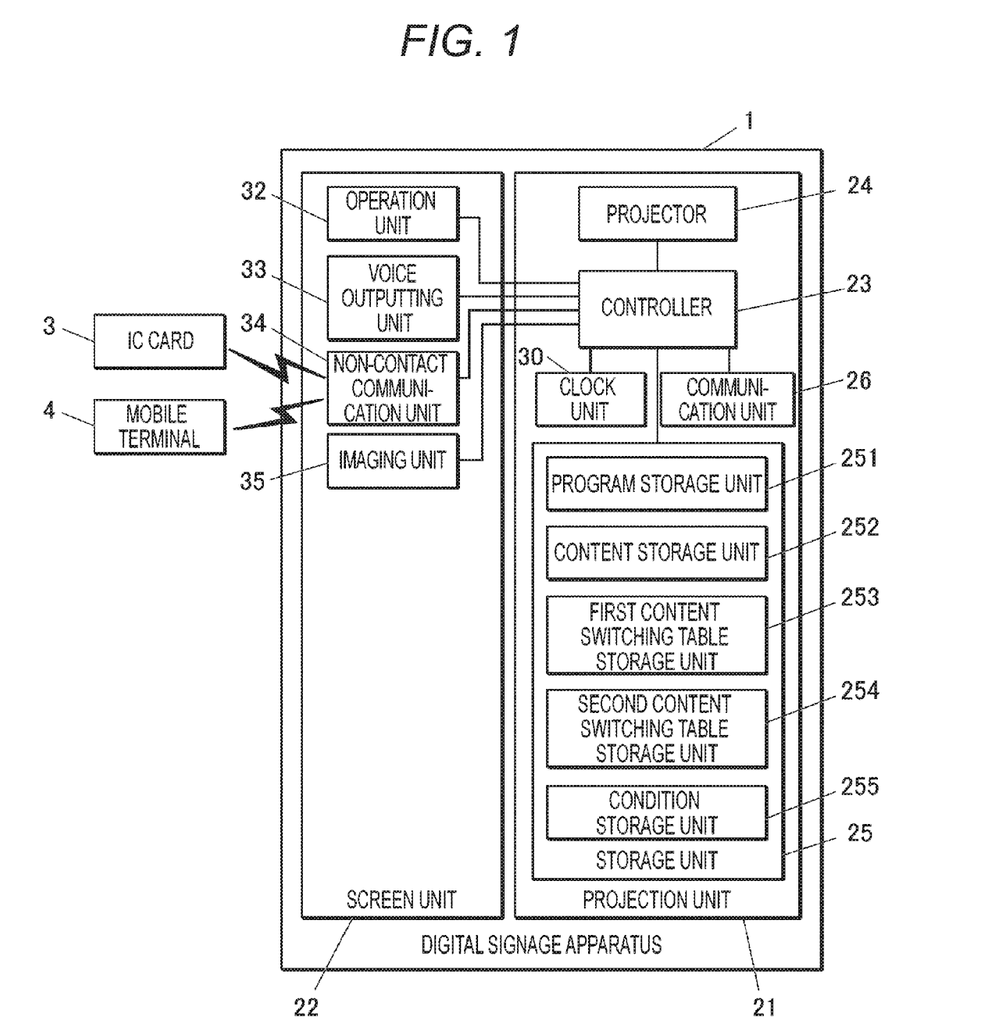
FIG. 1 is a block diagram of a functional structure of a digital signage apparatus according to the present embodiment.
Figure 2:
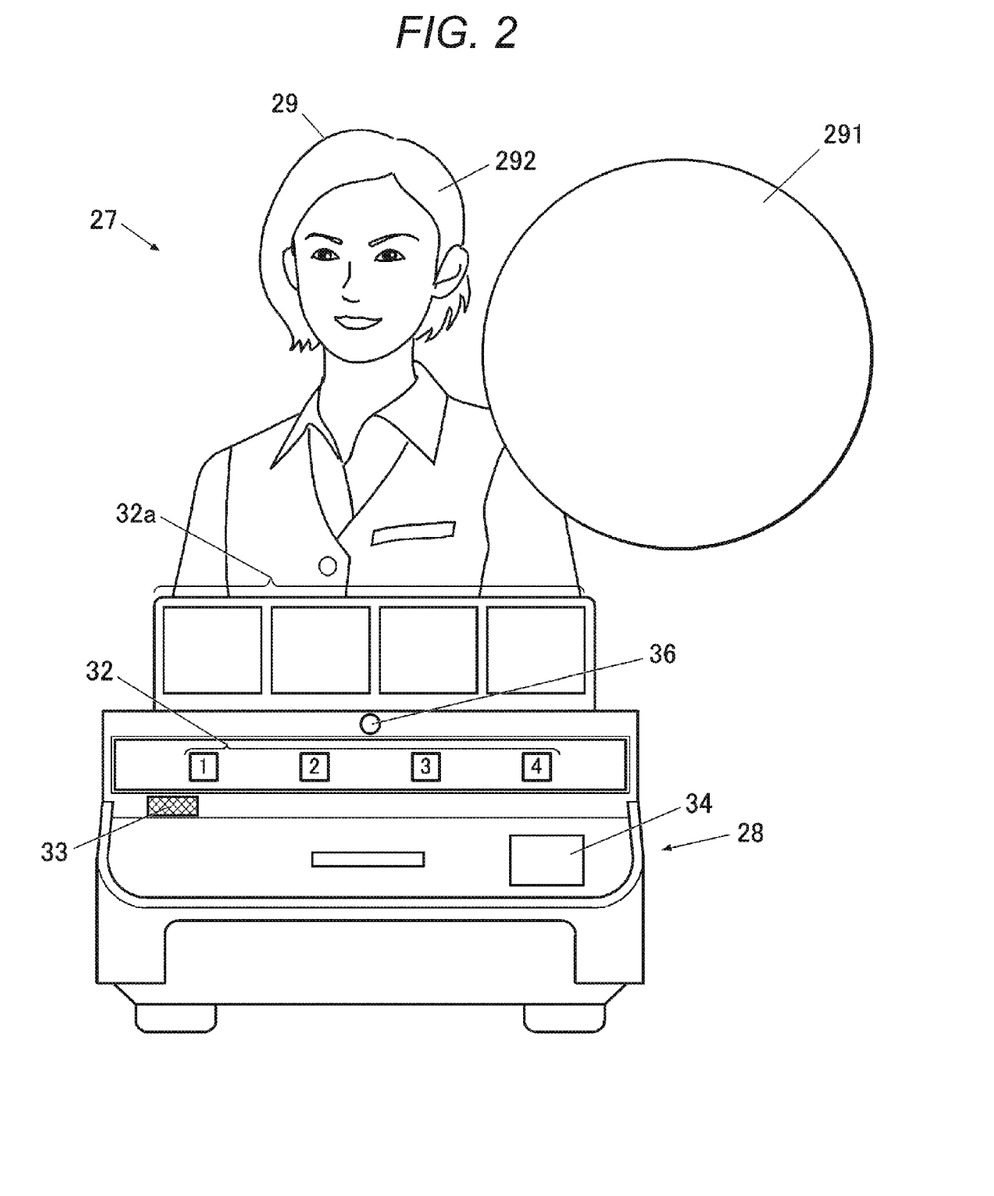
FIG. 2 is a diagram of an outline structure of a screen unit in FIG. 1.

FIG. 1 is a block diagram of a main control structure of a digital signage apparatus 1. FIG. 2 is a front view of an outline structure of a screen unit 22 in FIG. 1. For example, the digital signage apparatus 1 is placed in a store and the like and outputs an advertisement content such as merchandise explanation to a customer.

As illustrated in FIG. 1, the digital signage apparatus 1 includes a projection unit 21 which emits video light of a content and the screen unit 22 which receives the video light emitted from the projection unit 21 on its back surface and projects the video light on a front surface.

First, the projection unit 21 will be described.

The projection unit 21 includes a controller 23, a projector 24, a storage unit 25, a communication unit 26, and a clock unit 30. As illustrated in FIG. 1, the projector 24, the storage unit 25, the communication unit 26, and the clock unit 30 are connected to the controller 23.

The controller 23 includes a CPU which performs predetermined calculations and controls each part by executing various programs stored in a program storage unit 251 of the storage unit 25 and a memory to be a work area at the time of executing the program (both of them are not shown). The controller 23 functions as a first face recognition unit, a determination unit, a second face recognition unit, a control unit, and an estimation unit by performing various processing such as content output processing to be described by working with the program.

The projector 24 is a projecting device which converts image data output from the controller 23 into the video light and emits it to the screen unit 22. As the projector 24, for example, a digital light processing (DLP) (registered trademark) projector for using a digital micromirror device (DMD) which is a display device for forming a light image can be applied. The light image is formed by reflection light by performing a display operation by individually turns on/off each inclination angle of a plurality of (in a case of XGA, 1024 pixels in horizontal direction*768 pixels in vertical direction) micromirrors which is arranged in an array at high speed.

The storage unit 25 is configured of a hard disk drive (HDD) and a non-volatile semiconductor memory. As illustrated in FIG. 1, the program storage unit 251 is provided in the storage unit 25. The program storage unit 251 stores a system program performed by the controller 23, a processing program to perform various processing such as the content output processing to be described, and data necessary for the execution of these programs.

Also, a content storage unit 252 is provided in the storage unit 25. The content storage unit 252 stores data of the content output by the digital signage apparatus 1 as corresponding it to identification information of the content. For example, the content data includes moving picture data including a plurality of frame images and voice data corresponding to each frame image. The content includes a general content (referred to as a general content) which corresponds to any sex or age, a first content, and a second content (to be described below in detail).

Also, a first content switching table storage unit 253 and a second content switching table storage unit 254 are provided in the storage unit 25.

Here, the first content is a content which corresponds to broad characteristics of a person (here, sex and age group)

estimated based on a face of the person recognized from a captured image with a first image quality (low resolution). The second content is a content which corresponds to detailed characteristics (here, sex and age) estimated based on a face recognized from a captured image with a second image quality (high resolution).

Figure 3:
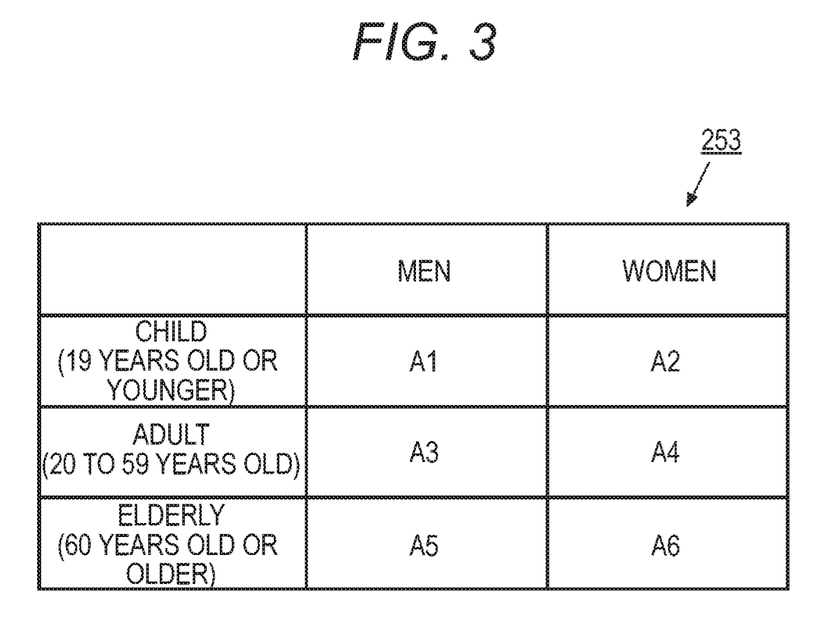
FIG. 3 is a diagram of exemplary data storage in a first content switching table storage unit.

The first content switching table storage unit 253 stores the characteristics (sex and age group) of the person estimated based on the face recognized from the captured image with the first image quality and the identification information of the content which is suitable for a customer having the characteristics in correspondence with each other. Exemplary data storage in the first content switching table storage unit 253 is illustrated in FIG. 3.

Figure 4:
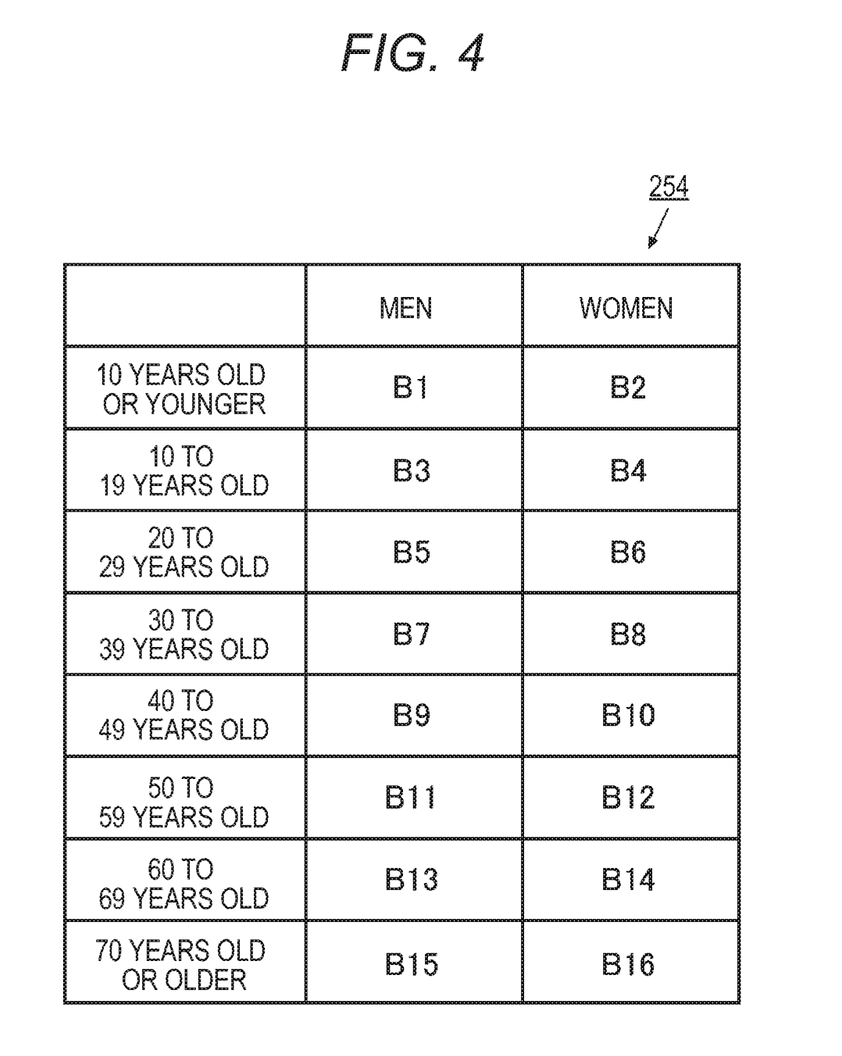
FIG. 4 is a diagram of exemplary data storage in a second content switching table storage unit.

The second content switching table storage unit 254 stores the characteristics (sex and age) of the person estimated based on the face recognized from the captured image with the second image quality and the identification information of the content which is suitable for a customer having the characteristics in correspondence with each other. Exemplary data storage in the second content switching table storage unit 254 is illustrated in FIG. 4.

Also, a condition storage unit 255 is provided in the storage unit 25. The condition storage unit 255 stores a condition to switch a mode from a first image quality mode (mode for photographing with low resolution) to a second image quality mode (mode for photographing with high resolution). This condition can be set by an operation unit 32 or via the communication unit 26.

The communication unit 26 is configured of a modem, a router, a network card, and the like. The communication unit 26 communicates with an external device connected to a communication network such as a local area network (LAN).

The clock unit 30 is configured of a real time clock (RTC) and the like. The clock unit 30 obtains current date and time and outputs it to the controller 23.

Next, the screen unit 22 will be described.

As illustrated in FIG. 2, the screen unit 22 includes an image forming unit 27 and a base 28 which supports the image forming unit 27.

The image forming unit 27 is a screen in which a film screen 291 for back surface projection in which film-shaped fresnel lenses are laminated and a film 292 on which a person has been previously printed are bonded to a single transparent plate 29. The transparent plate 29 is formed of, for example, an acrylic plate and molded in a human shape, and the transparent plate 29 is arranged substantially perpendicular to an irradiation direction of the video light. The projector 24 projects an image to a region in the image forming unit 27 where the film screen 291 is bonded. By bonding the film screen 291 to the whole transparent plate 29, a human may be projected. An output unit includes the image forming unit 27 and the projector 24.

A button type operation unit 32, a voice outputting unit 33, such as a speaker, which outputs voice, a non-contact communication unit 34, and an imaging unit 35 are provided in the base 28.

The operation unit 32 includes a plurality of operation buttons, detects a depression signal of the operation button, and outputs it to the controller 23. The operation buttons respectively corresponds to display regions 32a which displays processing performed by pressing the operation button, a destination of the content switched by pressing the operation button, and the like.

The non-contact communication unit 34 has a radio communication function by a near field communication (NFC) and the like. The non-contact communication unit 34 transmits/receives data to/from a mobile terminal 4 and read/write the data from/to an IC card 3 and the mobile terminal 4 by performing radio communication with the IC card 3 and the mobile terminal 4. The non-contact communication unit 34 functions as a detection unit.

Here, for example, the IC card 3 is a membership card of a store where the digital signage apparatus 1 is placed, and the IC card 3 can perform non-contact communication. A customer ID and the like to identify the customer are stored in the IC card 3. The mobile terminal 4 is a mobile terminal held by the customer which can perform the non-contact communication and stores the customer ID and the like to identify the customer. When an operation for holding the IC card 3 or the mobile terminal 4 over the controller 23 has been detected by the non-contact communication unit 34, the controller 23 of the digital signage apparatus 1 reads the customer ID written in the IC card 3 or the mobile terminal 4 and performs log-in authentication. Then, a predetermined service is provided.

The imaging unit 35 continuously photographs images of a space opposed to the image forming unit 27 and generates the captured image. The imaging unit 35 includes a camera and an imaging controller which are not shown. The camera includes an optical system and an imaging element, and the imaging controller controls the camera.

The optical system of the camera is faced to a direction in which the person (customer) in front of the image forming unit 27 can be photographed. Also, for example, the imaging element is an image sensor such as a charge coupled device (CCD) and a complementary metal-oxide semiconductor (CMOS). The imaging element converts an optical image which has passed through the optical system into a two-dimensional image signal.

As illustrated in FIG. 1, the operation unit 32, the voice outputting unit 33, the non-contact communication unit 34, and the imaging unit 35 are connected to the controller 23.

[Operation of Digital Signage Apparatus 1]

Next, an operation of the digital signage apparatus 1 will be described.

Figure 5:
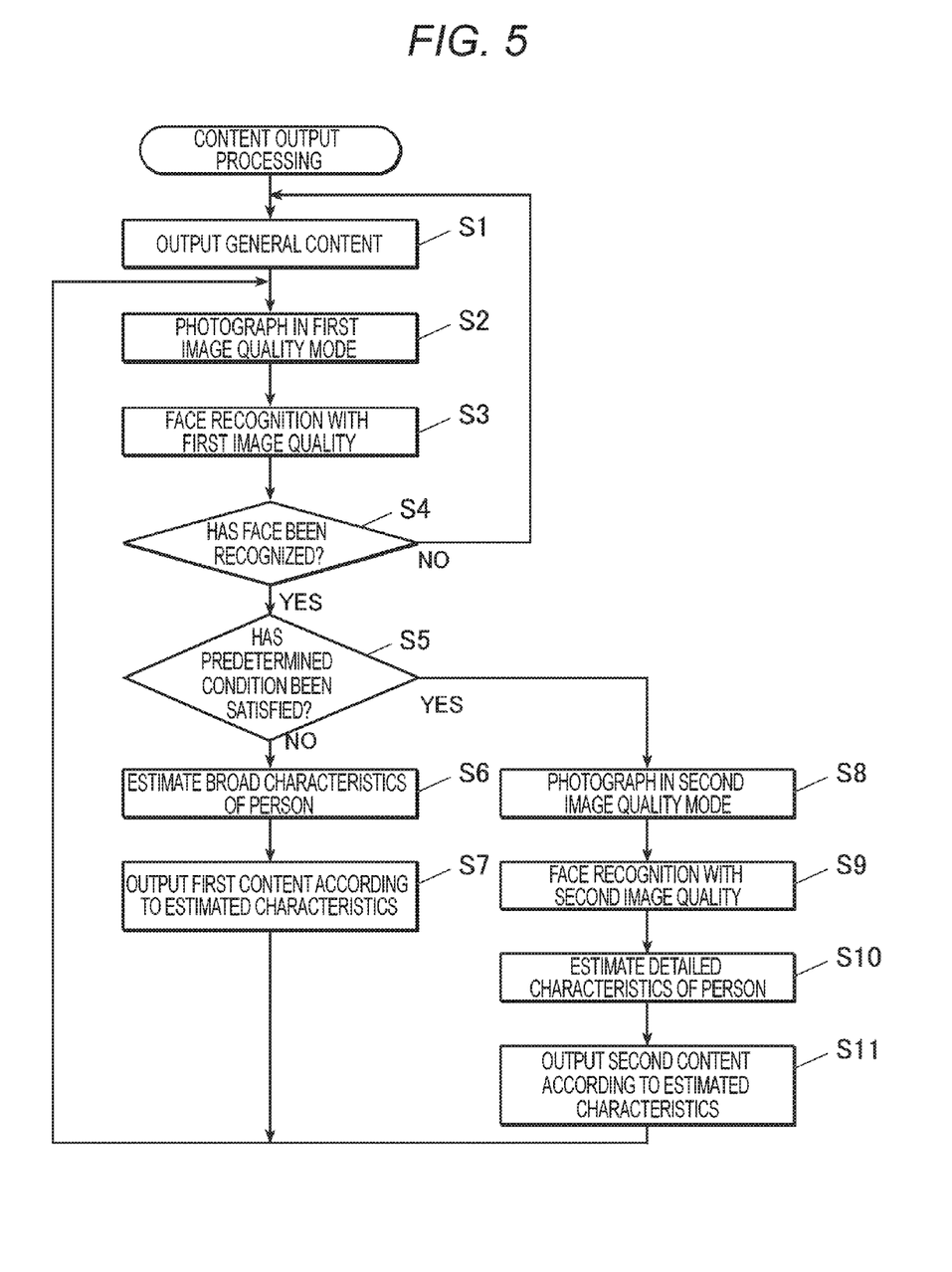
FIG. 5 is a flowchart of content output processing performed by a controller in FIG. 1.

A flowchart of the content output processing performed by the digital signage apparatus 1 is illustrated in FIG. 5. The content output processing is performed by the controller 23 together with the program stored in the program storage unit 251 when a power source of the digital signage apparatus 1 is turned ON.

First, the controller 23 makes the image forming unit 27 and the voice outputting unit 33 output the content (step S1). For example, the controller 23 reads the content data of the general content from the content storage unit 252 and sequentially outputs the frame image to the projector 24. The projector 24 projects it to the image forming unit 27. Also, the controller 23 outputs voice data of the read content data to the voice outputting unit 33 and makes the voice outputting unit 33 output the voice of the content.

Sequentially, the controller 23 obtains a captured image by photographing it by the imaging unit 35 in the first image quality mode (low resolution mode) (step S2) and performs the face recognition processing to the obtained captured image with the first image quality (step S3). A method of the face recognition is not especially limited. However, the face recognition can be performed by using, for example, a known image processing technique such as a method by using Haar-like characteristics disclosed in JP 2012-53813 A.

Sequentially, the controller 23 determines whether the face has been recognized as a result of the face recognition processing (step S4). When the controller 23 has determined that the face has not been recognized (step S4; NO), the controller 23 returns to step S1.

When it has been determined in step S4 that the face has been recognized (step S4; YES), the controller 23 determines whether a predetermined condition has been satisfied (step S5).

Here, since the captured image with the first image quality photographed in the first image quality mode has low resolution, the face recognition processing can be performed at high speed. However, estimating accuracy of sex and age estimation processing to be described is low, and especially, an age-recognition error is large. On the other hand, since the captured image with the second image quality photographed in the second image quality mode (high resolution mode) has high resolution, it takes time to perform processing such as the face recognition processing. However, the estimating accuracy of the sex and age estimation processing to be described is high. In the present embodiment, when a predetermined condition is satisfied in which a behavior of the person in the captured image can be assumed to be interested in the content, a mode is changed to the second image quality mode and photographing is performed, and the face recognition and the sex and age estimation are performed. Then, a content which is more suitable for the person who looks at the content is output. For example, the above predetermined condition is a condition (1) that a user operation has been detected (the user has operated the digital signage apparatus 1), a condition (2) that the size of the recognized face has become equal to or larger than a predetermined size (the user came closer to the digital signage apparatus 1), or a condition (3) that a moving amount of the recognized face has become equal to or smaller than a predetermined amount (the user stops moving and looks at the content at rest. The predetermined condition to switch the mode to the second image quality mode is, for example, any one of (1) to (3) or a combination of them and is stored (set) in the condition storage unit 255.

Regarding the condition (1), when any one of the operation of any operation buttons of the operation unit 32, the operation to hold over the IC card 3, and the operation to hold over the mobile terminal 4 has been detected, the controller 23 determines that the user operation has been detected. The detection of the operation to hold over the IC card 3 and the mobile terminal 4 is determined according to whether the IC card 3 and the mobile terminal 4 have been detected in a communication area of the non-contact communication unit 34.

Also, regarding the condition (2), when the size of the face recognized in the face recognition processing in step S3 has become equal to or larger than the predetermined size, the controller 23 determines that the size of the recognized face has become equal to or larger than the predetermined size.

Also, regarding the condition (3), the controller 23 once stores a position of the face recognized in the previous face recognition processing (for example, a coordinate of the center position of the face) in a memory. Then, when a difference between the position of the face at the previous time and the position of the face at this time is equal to or less than a predetermined amount, the controller 23 determines that the moving amount of the recognized face has become equal to or smaller than the predetermined amount.

When the controller 23 has determined in step S5 that the predetermined condition has not been satisfied (step S5; NO), the controller 23 estimates broad characteristics (here, sex, age group) of the person based on the face recognized from the captured image (step S6).

Specifically, the sex and age estimation processing is performed based on the face recognized by a sex and age determining program stored in the program storage unit 251. The method for estimating the age is not especially limited. However, a known image processing technique can be used, such as a method for estimating the age based on a wrinkle feature amount, a spot feature amount, and a lip feature amount in a face region disclosed in JP 2012-53813 A and a method for estimating the age based on an outline of the face, the arrangement of parts including eyes, a nose, and a mouth, and a skin condition extracted from the face image. The age group is estimated by classifying the estimated age into the child, the adult, and the elderly. When a plurality of faces has been recognized, for example, the sex and the age group of the people are estimated based on the biggest face.

The controller 23 refers to the first content switching table storage unit 253 and switches the content to be output to a content in the first content according to the estimated broad characteristics. Then, the controller 23 makes the image forming unit 27 and the voice outputting unit 33 output the content (step S7), and the procedure returns to step S2.

On the other hand, when it has been determined in step S5 that the predetermined condition has been satisfied (step S5; YES), the controller 23 obtains the captured image by photographing by the imaging unit 35 in the second image quality mode (step S8) and performs the face recognition processing to the obtained captured image with the second image quality (step S9).

Sequentially, the controller 23 estimates the detailed characteristics of the person (here, sex and age) based on the recognized face (step S10). Specifically, the controller 23 estimates the age based on the estimated age by performing the sex and age estimation processing based on the face recognized by the sex and age determining program stored in the program storage unit 251. When the plurality of faces has been recognized, for example, the sex and the age of the people are estimated based on the biggest face.

The controller 23 refers to the second content switching table storage unit 254 and switches the content to be output to a content in the second content according to the detailed characteristics of the recognized person. Then, the controller 23 makes the image forming unit 27 and the voice outputting unit 33 output the content (step S11), and the procedure returns to step S2.

The controller 23 repeats the processing in steps S1 to S11 when the power source of the digital signage apparatus 1 is turned ON.

According to the content output processing, when the face of the person is not recognized in front of the digital signage apparatus 1 or when the predetermined condition is not satisfied in which the person is assumed to be interested in the content although the face of the person is recognized, the processing time of the face recognition processing can be reduced and a load to the CPU of the controller 23 can be reduced by performing the face recognition to the captured image with the first image quality photographed in the first image quality mode with the low resolution. Also, when the face of the person is recognized, the sex and broad age group of the person is estimated at a level obtained with the first image quality, and the first content can be output based on the estimated result. On the other hand, when the behavior of the person satisfies the predetermined condition in which the person can be assumed to be interested in the content, the sex and the age of the person are accurately estimated and the second content which is more suitable for the person can be output by performing the face recognition to the captured image with the second image quality photographed in the second image quality mode with high resolution.

As described above, according to the digital signage apparatus 1, the controller 23 makes the imaging unit 35 photograph in the first image quality mode and performs the face recognition to the captured image obtained by the imaging unit 35. When the predetermined condition is satisfied in which the behavior of the person in front of the digital signage apparatus 1 can be assumed to be interested in the digital signage apparatus 1, the controller 23 makes the imaging unit 35 photograph in the second image quality mode of which the quality is higher than the first image quality and performs the face recognition to the captured image obtained by the imaging unit 35. The above case includes a case where the user operation has been detected, a case where the size of the face recognized by the captured image is equal to or larger than the predetermined size, and a case where the moving amount of the face recognized by the captured image is equal to or less than the predetermined amount.

Therefore, for example, before a person who satisfies the predetermined condition in which the person can be assumed to be interested in the digital signage apparatus 1 is found, the processing time can be reduced and the load to the CPU of the controller 23 can be reduced by performing the face recognition by using the captured image with the first image quality and low resolution. Also, when the person who satisfies the predetermined condition in which the person can be assumed to be interested in the digital signage apparatus 1 has been found, the face recognition can be performed with the necessary image quality. For example, the face recognition is performed by using the captured image with the second image quality and the high resolution necessary for obtaining the detailed characteristics of the person.

Also, when the face recognition by using the captured image with the first image quality has been switched to the face recognition by using the captured image with the second image quality, the controller 23 switches the content to be output. Specifically, the controller 23 makes the image forming unit 27 and the voice outputting unit 33 output the first content according to broad characteristics of the person estimated based on the face recognized by the face recognition by using the captured image with the first image quality. When the behavior of the person has satisfied the predetermined condition in which the person can be assumed to be interested in the digital signage apparatus 1 so that the face recognition has been switched to the face recognition by using the captured image with the second image quality, the controller 23 switches the content to be output to the second content according to the detailed characteristics of the person recognized by the face recognition by using the captured image with the second image quality.

Therefore, when the person who satisfies the predetermined condition in which the person can be assumed to be interested in the digital signage apparatus 1 does not exist, the first content corresponding to a wide range of people is output. When the predetermined condition has been satisfied in which the person can be assumed to be interested in the digital signage apparatus 1, the second content which is suitable for the person can be output.

The description in the embodiment is a preferred example of the digital signage apparatus according to the present invention, and the present invention is not limited to this.

For example, in the embodiment, an example has been described in which the captured image with the first image quality is obtained by photographing by the imaging unit 35 in the first image quality mode. However, the method for obtaining the captured image with the first image quality is not limited to this. For example, the captured image with the first image quality may be performed by thinning the captured images photographed by the imaging unit 35 with the second image quality.

Also, in the embodiment, the content is previously stored in the digital signage apparatus 1, and the content suitable for the recognized person is selected from among the stored contents. However, the content is stored in a server device connected via the communication network, and the content suitable for the characteristics of the recognized person may be received from the server device.

Also, in the embodiment, an example has been described in which the present invention is applied to the digital signage apparatus which displays the image by projecting the image from the projector to the screen. However, the similar effect can be obtained by applying the present invention to an information processor having other display device such as a liquid crystal display and a plasma display, and the present invention is not limited to this example.

Also, in the embodiment, an example has been described in which the image forming unit 27 has a human shape. However, the image forming unit 27 may have other shapes, and the present invention is not limited to this.

Also, in the content output processing according to the embodiment, the content is not evaluated. However, after an output history of the content is stored in the storage unit 25, the first content may be evaluated by counting the output history of the content when a predetermined collecting timing (for example, every fixed period) has come.

Here, the output of the second content means that the behavior of the person in front of the digital signage apparatus 1 has satisfied the predetermined condition in which the person can be assumed to be interested in the content. Therefore, it can be considered that the first content which has been output immediately before the second content attracts the person. The first content can be evaluated by calculating a probability that the second content has been output during/immediately after the output of the first content based on the output history of the content.

For example, in the content output processing, the controller 23 stores the identification information of the content of the switched destination in the storage unit 25 as the output history every time when the content is switched to a new content. When the collecting timing comes, the controller 23 calculates the probability (that is, a probability to be switched to the second content) of the output of the second content during/immediately after the output of the first content based on the output history of the content stored in the storage unit 25. Then, the first content is evaluated based on the calculated probability (first evaluation unit).

For example, when there are first contents A1 to A3, a probability of the output of the second content during/immediately after the output of each first content is calculated. For example, in a case where the probability that the second content has been output after the first content A1 is 20%, the probability that the second content has been output after the first content A2 is 50%, and the probability that the second content has been output after the first content A3 is 10%, an evaluation A2>A1>A3 can be given.

Also, in the embodiment, it has been described that the result of the face recognition is used to switch the content. However, the result may be used to evaluate the content and to obtain data for marketing.

For example, in step S1 in the flow of the content output processing in FIG. 5, the controller 23 starts an output of a content to be evaluated (marketing) not the general content. When it has been determined in step S5 that the predetermined condition has not been satisfied, the controller 23 does not perform steps S6 and S7, and the procedure returns to step S2. When it has been determined in step S5 that the predetermined condition has been satisfied, the controller 23 makes the imaging unit 35 photograph in the second image quality mode and performs the face recognition processing to the obtained captured image with the second image quality. The controller 23 estimates the sex and the age based on the recognized face and stores the identification information of the output content and the estimated sex and age in the storage unit 25 as corresponding them to each other, and the procedure returns to step S2.

The controller 23 collects the sexes and ages of the people who have looked at the content for each content at the predetermined collecting timing based on the information stored in the storage unit 25 in this way, and accordingly, the sex and the age group of the people who have been interested in the content can be grasped. Also, since the content is the merchandise explanation as described above, the sex and the age of the people who are interested in the product explained in the content can be obtained as marketing information.

Also, during the output of the content, the time period when the face has been recognized with the first image quality is the time period when the person has stayed in front of the digital signage apparatus 1, and the time period when the face has been recognized with the second image quality is the time period when the person can be assume to be interested in the content. Therefore, the content in which the face has been recognized with the second image quality for a long time can be highly evaluated. During the output of each content to be evaluated, the controller 23 measures the time period when the face is recognized with the first image quality and the time period when the face is recognized with the second image quality and weights the time period when the face has been recognized with the second image quality relative to the time period when the face has been recognized with the first image quality. Then, the controller 23 may evaluate each content based on the added time (second evaluation unit).

Here, for example, the time period when the face is recognized with the first image quality can be the time until it is determined in step S4 that the face has not been recognized or it is determined in step S5 that the predetermined condition has been satisfied after the face has been once recognized in step S4 in FIG. 5. Also, for example, the time period when the face is recognized with the second image quality can be the time until the face has not been recognized from the captured image or it is determined that the predetermined condition has not been satisfied after it has been once determined in step S5 that the predetermined condition has been satisfied.

Also, the controller 23 may evaluate the direction of the digital signage apparatus 1 based on the position of the face (face which has not been recognized at the previous face recognition) which has been recognized for the first time when the face recognition is performed to the captured image with the first image quality.

For example, when the face of the person, who has not been recognized from the captured image with the first image quality at the previous face recognition, has been recognized, the controller 23 determines a direction in which the person has come based on the position where the face has been recognized in the captured image with the first image quality (direction determination unit) and monitors whether the face is recognized from the captured image with the second image quality. When the recognition of the face of the person is stopped, the controller 23 stores information, which indicates whether the face has been recognized from the captured image with the second image quality, in the storage unit 25 as corresponding it to the direction in which the person has come. When the predetermined collecting timing comes, the controller 23 calculates a probability that the face has been recognized from the captured image with the second image quality for each direction in which the person has come based on the information stored in the storage unit 25. Then, the controller 23 detects the direction of the arrival of the customer who is interested in the content output by the digital signage apparatus 1 based on the calculated probability and evaluates the direction of the digital signage apparatus 1 (third evaluation unit). For example, when the probability that the customer has come from the right is high, by outputting advise such as to face the digital signage apparatus 1 to the left from the image forming unit 27 and the voice outputting unit 33, the screen unit 22 of the digital signage apparatus 1 can be faced to the direction in which the customer has more interest. Accordingly, an advertisement effect as a whole is improved.

The functions of the first to third evaluation units may be performed by the server device connected via the communication network.

In addition, a detailed structure and a detailed operation of the digital signage apparatus can be appropriately changed without departing from the scope of the invention.

An embodiment of the present invention has been described. However, the scope of the present invention is not limited to the embodiment and includes a range of the invention described in claims and a range equivalent to the same.

What is claimed is:

1. An information processor comprising:
a camera configured to take an image of a person;
a CPU configured to: (i) perform face recognition on a captured image with a first image quality obtained from the image taken by the camera, (ii) determine whether a behavior of the person satisfies a predetermined condition, and (iii) perform face recognition on a captured image with a second image quality obtained from the image taken by the camera, when it is determined that the behavior of the person satisfies the predetermined condition, the second image quality being higher than the first image quality; and
a detector configured to detect a user operation,
wherein the CPU determines that the behavior of the person satisfies the predetermined condition (i) in a case where the detector has detected the user operation, (ii) in a case where a size of a face recognized from the captured image with the first image quality is equal to or larger than a predetermined size, and (iii) in a case where a moving amount of the face recognized from the captured image with the first image quality is equal to or less than a predetermined amount.

2. An information processor comprising:
a camera configured to take an image of a person;
a CPU configured to: (i) perform face recognition on a captured image with a first image quality obtained from the image taken by the camera, (ii) determine whether a behavior of the person satisfies a predetermined condition, and (iii) perform face recognition on a captured image with a second image quality obtained from the image taken by the camera, when it is determined that the behavior of the person satisfies the predetermined condition, the second image quality being higher than the first image quality; and
an output device configured to output a content,
wherein the CPU switches the content to be output when the face recognition is switched.

3. The information processor according to claim 1, further comprising:
an output device configured to output a content, wherein the CPU switches the content to be output when the face recognition is switched.

4. The information processor according to claim 2, wherein:
the CPU estimates characteristics of the person based on the face on which the face recognition is performed,
when the face recognition is performed by using the captured image with the first image quality, the CPU makes the output device output a first content according to the characteristics of the person estimated based on the recognized face, and when the face recognition is performed by using the captured image with the second image quality, the CPU switches the content to be output to a second content according to the characteristics of the person estimated based on the recognized face.

5. The information processor according to claim 3, wherein:
the CPU estimates characteristics of the person based on the face on which the face recognition is performed,
when the face recognition is performed by using the captured image with the first image quality, the CPU makes the output device output a first content according to the characteristics of the person estimated based on the recognized face, and when the face recognition is performed by using the captured image with the second image quality, the CPU switches the content to be output to a second content according to the characteristics of the person estimated based on the recognized face.

6. The information processor according to claim 4, wherein:
the CPU calculates a probability that the content to be output will be switched to the second content during or immediately after the output of the first content, and evaluates the first content based on the calculated probability.

7. The information processor according to claim 5, wherein:
the CPU calculates a probability that the content to be output will be switched to the second content during or immediately after the output of the first content, and evaluates the first content based on the calculated probability.

8. An information processor comprising:
a camera configured to take an image of a person;
a CPU configured to: (i) perform face recognition on a captured image with a first image quality obtained from the image taken by the camera, (ii) determine whether a behavior of the person satisfies a predetermined condition, and (iii) perform face recognition on a captured image with a second image quality obtained from the image taken by the camera, when it is determined that the behavior of the person satisfies the predetermined condition, the second image quality being higher than the first image quality; and
an output device configured to output a content,
wherein during the output of the content, the CPU evaluates the content based on a time period in which the face recognition is performed on the captured image with the first image quality and a time period in which the face recognition is performed on the captured image with the second image quality.

9. The information processor according to claim 1, further comprising:
an output device configured to output a content,
wherein during the output of the content, the CPU evaluates the content based on a time period in which the face recognition is performed on the captured image with the first image quality and a time period in which the face recognition is performed on the captured image with the second image quality.

10. The information processor according to claim 1, wherein:
the CPU sequentially performs the face recognition on a captured image obtained based on continuous images taken by the camera,
when a face of a person who has not been recognized in previous face recognitions is recognized in the captured image with the first image quality, the CPU determines a direction in which the person has come based on a position where the face is recognized in the captured image with the first image quality, and
the CPU calculates a probability that the face recognized in the captured image with the first image quality will be recognized in the captured image with the second image quality for each direction in which the person may have come, and evaluates a direction of the information processor based on the calculated probability for each direction.

11. The information processor according to claim 2, wherein:
the CPU sequentially performs the face recognition on a captured image obtained based on continuous images taken by the camera,
when a face of a person who has not been recognized in previous face recognitions is recognized in the captured image with the first image quality, the CPU determines a direction in which the person has come based on a position where the face is recognized in the captured image with the first image quality, and
the CPU calculates a probability that the face recognized in the captured image with the first image quality will be recognized in the captured image with the second image quality for each direction in which the person may have come, and evaluates a direction of the information processor based on the calculated probability for each direction.

12. The information processor according to claim 3, wherein:
the controller sequentially performs the face recognition on a captured image obtained based on continuous images taken by the imaging unit,
when a face of a person who has not been recognized in previous face recognitions is recognized in the captured image with the first image quality, the CPU determines a direction in which the person has come based on a position where the face has been recognized in the captured image with the first image quality, and the CPU calculates a probability that the face recognized in the captured image with the first image quality will be recognized in the captured image with the second image quality for each direction in which the person may have come, and evaluates a direction of the information processor based on the calculated probability for each direction.

13. The information processor according to claim 4, wherein:

the CPU sequentially performs the face recognition on a captured image obtained based on continuous images taken by the camera, when a face of a person who has not been recognized in previous face recognitions is recognized in the captured image with the first image quality, the CPU determines a direction in which the person has come based on a position where the face is recognized in the captured image with the first image quality, and the CPU calculates a probability that the face recognized in the captured image with the first image quality will be recognized in the captured image with the second image quality for each direction in which the person may have come, and evaluates a direction of the information processor based on the calculated probability for each direction.

14. The information processor according to claim 5, wherein:

the CPU sequentially performs the face recognition on a captured image obtained based on continuous images taken by the camera, when a face of a person who has not been recognized in previous face recognitions is recognized in the captured image with the first image quality, the CPU determines a direction in which the person has come based on a position where the face is recognized in the captured image with the first image quality, and the CPU calculates a probability that the face recognized in the captured image with the first image quality will be recognized in the captured image with the second image quality for each direction in which the person may have come, and evaluates a direction of the information processor based on the calculated probability for each direction.

15. The information processor according to claim 6, wherein:

the CPU sequentially performs the face recognition on a captured image obtained based on continuous images taken by the camera, when a face of a person who has not been recognized in previous face recognitions is recognized in the captured image with the first image quality, the CPU determines a direction in which the person has come based on a position where the face is recognized in the captured image with the first image quality, and the CPU calculates a probability that the face recognized in the captured image with the first image quality will be recognized in the captured image with the second image quality for each direction in which the person may have come, and evaluates a direction of the information processor based on the calculated probability for each direction.

16. The information processor according to claim 7, wherein:

the CPU sequentially performs the face recognition on a captured image obtained based on continuous images taken by the camera, when a face of a person who has not been recognized in previous face recognitions is recognized in the captured image with the first image quality, the CPU determines a direction in which the person has come based on a position where the face is recognized in the captured image with the first image quality, and the CPU calculates a probability that the face recognized in the captured image with the first image quality will be recognized in the captured image with the second image quality for each direction in which the person may have come, and evaluates a direction of the information processor based on the calculated probability for each direction.

17. The information processor according to claim 8, wherein:

the CPU sequentially performs the face recognition on a captured image obtained based on continuous images taken by the camera, when a face of a person who has not been recognized in previous face recognitions is recognized in the captured image with the first image quality, the CPU determines a direction in which the person has come based on a position where the face is recognized in the captured image with the first image quality, and the CPU calculates a probability that the face recognized in the captured image with the first image quality will be recognized in the captured image with the second image quality for each direction in which the person may have come, and evaluates a direction of the information processor based on the calculated probability for each direction.

18. A non-transitory, computer-readable medium having stored thereon a program that when executed by a computer having a detector that detects a user operation, causes the computer to perform operations of:

recognizing a face from a captured image with a first image quality obtained based on an image taken by a camera which images a person, determining whether a behavior of the person satisfies a predetermined condition, and recognizing a face from a captured image with a second image quality higher the first image quality obtained based on the image taken by the camera, when it is determined that the behavior of the person satisfies the predetermined condition, wherein the computer determines that the behavior of the person satisfies the predetermined condition (i) in a case where the detector has detected the user operation, (ii) in a case where a size of a face recognized from the captured image with the first image quality is equal to or larger than a predetermined size, and (iii) in a case where a moving amount of the face recognized from the captured image with the first image quality is equal to or less than a predetermined amount.

19. A non-transitory, computer-readable medium having stored thereon a program that when executed by a computer having an output device configured to output a content, causes the computer to perform operations of:

recognizing a face from a captured image with a first image quality obtained based on an image taken by a camera which images a person, determining whether a behavior of the person satisfies a predetermined condition, and recognizing a face from a captured image with a second image quality higher the first image quality obtained based on the image taken by the camera, when it is determined that the behavior of the person satisfies the predetermined condition, wherein the computer switches the content to be output when the computer switches to recognizing the face from the captured image with the second image quality.

20. A non-transitory, computer-readable medium having stored thereon a program that when executed by a computer having an output device configured to output a content, causes the computer to perform operations of:

recognizing a face from a captured image with a first image quality obtained based on an image taken by a camera which images a person, determining whether a behavior of the person satisfies a predetermined condition, recognizing a face from a captured image with a second image quality higher the first image quality obtained based on the image taken by the camera, when it is determined that the behavior of the person satisfies the predetermined condition, and evaluating the content, during the output thereof, based on a time period in which the face recognition is performed on the captured image with the first image quality and a time period in which the face recognition is performed on the captured image with the second image quality.

* * * * *

UNITED STATES PATENT AND TRADEMARK OFFICE
CERTIFICATE OF CORRECTION

Page 1 of 1

PATENT NO. : 9,760,765 B2
APPLICATION NO. : 15/009703
DATED : September 12, 2017
INVENTOR(S) : Atsushi Shibutani It is certified that error appears in the above-identified patent and that said Letters Patent is hereby corrected as shown below:

In the Claims

Column 12, Line 62, delete "controller" and insert --CPU--.

Column 12, Line 64, delete "imaging unit," and insert --a camera--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*